US008775337B2

(12) United States Patent
Bahl et al.

(10) Patent No.: US 8,775,337 B2
(45) Date of Patent: Jul. 8, 2014

(54) VIRTUAL SENSOR DEVELOPMENT

(75) Inventors: Paramvir Bahl, Bellevue, WA (US);
Aman Kansal, Issaquah, WA (US);
Romit Roy Choudhury, Durham, NC
(US); David Chiyuan Chu, Redmond,
WA (US); Alastair Wolman, Seattle,
WA (US); Jie Liu, Medina, WA (US);
Xuan Bao, Durham, NC (US)

(73) Assignee: Microsoft Corporation, Redmond, WA
(US)

( * ) Notice: Subject to any disclaimer, the term of this
patent is extended or adjusted under 35
U.S.C. 154(b) by 324 days.

(21) Appl. No.: 13/330,457

(22) Filed: Dec. 19, 2011

(65) Prior Publication Data
US 2013/0159223 A1 Jun. 20, 2013

(51) Int. Cl.
*G06F 15/18* (2006.01)

(52) U.S. Cl.
USPC .......................................................... 706/12

(58) Field of Classification Search
CPC combination set(s) only.
See application file for complete search history.

(56) References Cited

U.S. PATENT DOCUMENTS

| | | | |
|---|---|---|---|
| 5,402,117 A | 3/1995 | Zijderhand | |
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 6,104,712 A | 8/2000 | Robert et al. | |
| 6,125,388 A | 9/2000 | Reisman | |
| 6,236,933 B1 | 5/2001 | Lang | |
| 6,353,929 B1 | 3/2002 | Houston | |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,587,600 B1 | 7/2003 | Shipley | |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B2 | 1/2005 | Robarts et al. | |
| 6,845,091 B2 | 1/2005 | Ogier et al. | |

(Continued)

FOREIGN PATENT DOCUMENTS

WO WO9800787 A1 1/1998
WO WO0154044 A1 7/2001

OTHER PUBLICATIONS

Office action for U.S. Appl. No. 11/767,140, mailed on Jul. 31, 2012, Horvitz et al., "Swarm Sensing and Actuating", 31 pages.

(Continued)

*Primary Examiner* — Michael B Holmes
(74) *Attorney, Agent, or Firm* — Dan Choi; Carole Boelitz; Micky Minhas

(57) ABSTRACT

Embodiments include processes, systems, and devices for developing a virtual sensor. The virtual sensor includes one or more inference models. A decision engine utilizes an inference model associated with a mobile device to determine another inference model that is configured to accept physical sensor data from another mobile device. In this way, the virtual sensor can be developed for use with many mobile devices using initial inference models developed for a small number of mobile devices or a single mobile device. Embodiments also include methods to select mobile devices from which to request physical sensor data for virtual sensor input. Embodiments also include architectures that provide a library of virtual sensors.

20 Claims, 8 Drawing Sheets

(56) References Cited

U.S. PATENT DOCUMENTS

| | | | |
|---|---|---|---|
| 6,957,393 | B2 | 10/2005 | Fano et al. |
| 7,013,149 | B2 | 3/2006 | Vetro et al. |
| 7,042,470 | B2 | 5/2006 | Rhoads et al. |
| 7,092,946 | B2 | 8/2006 | Bodnar |
| 7,343,222 | B2 | 3/2008 | Solomon |
| 7,395,126 | B2 | 7/2008 | Decker |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052786 | A1 | 5/2002 | Kim et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0061261 | A1 | 3/2003 | Greene |
| 2003/0154476 | A1 | 8/2003 | Abbott, III et al. |
| 2004/0056103 | A1 | 3/2004 | Sepponen |
| 2004/0193696 | A1 | 9/2004 | Howard et al. |
| 2005/0034078 | A1 | 2/2005 | Abbott et al. |
| 2005/0234726 | A1 | 10/2005 | Torge et al. |
| 2006/0217843 | A1 | 9/2006 | Hara et al. |
| 2006/0265103 | A1 | 11/2006 | Orita |
| 2007/0016573 | A1 | 1/2007 | Nanavati et al. |
| 2007/0093940 | A1 | 4/2007 | Ng-Thow-Hing et al. |
| 2007/0115819 | A1 | 5/2007 | Stephens et al. |
| 2008/0154796 | A1 | 6/2008 | Pallister et al. |
| 2009/0088142 | A1 | 4/2009 | Baribault et al. |
| 2010/0159909 | A1 | 6/2010 | Stifelman |
| 2010/0248698 | A1 | 9/2010 | In et al. |
| 2011/0125678 | A1* | 5/2011 | Partridge ................. 706/12 |

OTHER PUBLICATIONS

Office action for U.S. Appl. No. 11/767,140, mailed on Mar. 22, 2013, Horvitz et al., "Swarm Sensing and Actuating", 35 pages.
Billinghurst et al., "An Evaluation of Wearable Information Spaces", Proceedings of the Virtual reality Annual International Symposium, Aug. 1998, pp. 1-pp. 8.
Billinghurst, "Resarch Directions in Wearable Computing", University of Washington, May 1998, pp. 1-pp. 48.
Billinghurst et al., "Wearable Devices: New Ways to Manage Information", IEEE Computer Society, Jan. 1999, pp. 57-pp. 64.
Chang, et al., "Developing Collaborative Applications with Mobile Cloud—A Case Study of Speech Recognition", In Journal of Internet Services and Information Security, vol. 1, Issue 1, May 2011, pp. 18-36.
Chen et al. , "A Survey of Context-Aware Mobile Computing Research", Darmouth Computer Science Techincal Report, Jan. 2000, pp. 1-pp. 16.
Chetan, et al., "Cloud Computing for Mobile World", Retrieved on: Sep. 22, 2011, Available at: http://chetan.ueuo.com/projects/CCMW.pdf.
Finley, Klint, "The 8 Most Important Types of Collaboration Apps for Smart Phones", Retrieved on: Sep. 22, 2011, Available at: http://www.readwriteweb.com/enterprise/2011/07/post-4.php.
Harter et al., "A Distributed Location System for the Active Office", IEEE Network, Jun. 27-Jul. 2, 1994, pp. 62-pp. 70.
Horvitz et al., "Attention-Sensitive Alerting in Computing Systems", Microsoft Research, Aug. 1999, pp. 1-pp. 26.
Horvitz et al., "In Pursuit of Effective Handsfree Decision Support: Couping Bayesian Inference, Speech Understanding, and User Models", Jun. 1995, pp. 1-pp. 8.
International Search Report Sep. 29, 2003 for PCT 00/20685.
Joachims, "Text Categorization with Support Vector Machines: Learning with Many Relevant Features", Machine Learning, European Conference on Machine Learning, Apr. 21, 1998, pp. 137-pp. 142.
Kuo et al., "Design and Implementation of Internet-based In-House Healthcare and Home Automation Systems", Distributed Control and Application Laboratory, Medical Mechatronics Research Group, Department of Mechanical Engineering, Chang-Gung University, Taiwan, Oct. 2003, pp. 2944-pp. 2949.
Liu et al., "Wireless and Mobile Technologies to enchance teaching and learning", National Central University, taiwain, Journal of Computer Assisted Learning, Jul. 2003, vol. 19, pp. 391-pp. 382.
Losee, "Minimizing information overload the ranking of elecronic messages", Journal of Information Science, 15, Elsevier Science Publishers B.V., Jan. 1989, pp. 179-pp. 189.
Low, "Connections: Social and Mobile tools for enhancing learning", The Knowledge Tree, An E-journal of learning Innovation, Edition 12, Nov. 2006, 9 pages.
Miluzzo, et al., "Darwin Phones: the Evolution of Sensing and Inference on Mobile Phones", In Proceedings of the 8th International Conference on Mobile Systems, Applications, and Services, Jun. 15-18, 2010, pp. 5-20.
Non-Final Office Action for U.S. Appl. No. 11/767,140, mailed on Nov. 28, 2011, Eric Horvitz et al., "Swarm Sensing and Actuating", 36 pages.
Rhodes et al., "Remembrance Agent: A continuously automated information retrieval system", The Proceedings of the First International Conference on the Pratice Application of Intelligent Agents and Multi Agent Technology, Apr. 1996, pp. 487-pp. 495.
Rhodes, "The wearable remembrance agent: A system for augmented memory", The Proceeding of the First International Symposium of Wearable Computers, Oct. 1997, pp. 123-pp. 128.
Santant, et al.., "UPNP Service Discovery for Heterogeneous Networks", Jun. 2006, 5 pages.
Schilit, "A System Architecture for Context-Aware Mobile Computing", Columbia university, Jul. 1995, pp. 1-pp. 153.
Schilit et al., "Context-Aware Computing Applications", In Proceedings of the Workshop on Mobile Computing Systems and Applications, Dec. 1994, pp. 85-pp. 90.
Schilit et al., "Customizing Mobile Applications", Proceedings USENIX Symposium on mobile and Location Independent Computing, Aug. 1993, pp#-pp. 9.
Schilit et al., "Dissemination Active Map Information to Mobile Hosts", IEEE Network, Sep.-Oct. 1994, pp. 22-pp. 21, vol. 8 No. 5.
Schilit et al., "The PARCTAB Mobile Computing System", IEEE WWWOS-IV, Oct. 1993, pp. 1-pp. 4.
Spreitzer et al., "Architectural Considerations for Scalable, Secure, Mobile Computing with Location Information", In the 14th International Conference on Distributed Computing Systems, Jun. 1994, pp. 29-pp. 38.
Spreitzer et al., "Providing Location Information in a Ubiquitous Computing Environment", SIGOPS, Dec. 1993, pp. 270-pp. 283.
Spreitzer et al., "Scalable, Secure, Mobile Computing with Location Information", Commincation of the ACM, Jul. 1993, vol. 36 Bo 7, pp. 1.
Starner, "Wearable Computing and Contextual Awareness", Massachusetts Institute of Technology, Jun. 1999, pp. 1-pp. 248.
Theimer et al., "Operating System Issues for PDAs", in Fourth Workshop on Workstation Operating Systems, Oct. 1993, pp. 1-pp. 7.
Want et al., "Active Badges and Personal Interactive Computing Objects", IEEE Transactions on Consumer Electronics, Feb. 1992, col. 38, No. 1, pp. 1-pp. 11.
Want et al., "The Active Badge Location System", ACM Tranaations on Information Systems, Jan. 1992, pp. 91-pp. 102 vol. 10. No. 1.
Weiser, "Some Computer Science Issues in Ubiquitous Computing", Communications of the ACM, Jul. 1993, pp. 75-84, vol. 36,No. 7.
Weiser, "The Computer for the 21st Century", Scientific American, Sep. 1991, pp. 94-pp. 104.
Workshop of Wearable Computing Systems, Schedule and Breakout Session Information, Aug. 19-21, 1996.

* cited by examiner

VIRTUAL SENSOR DEVELOPMENT

BACKGROUND

Mobile telephones often have various sensing modalities, such as global positioning service (GPS) receivers, microphones, compasses, accelerometers, cameras, and others. Some mobile device applications utilize these sensing modalities to perform various functions, such as to identify the location of the mobile device on a map or to determine nearby points of interest such as restaurants or shops. Over-usage of sensors can be a drain on battery resources or other resources such as processor throughput. Also, some mobile device applications are hosted by a cloud computing service, requiring that sensor data be uploaded to an application server somewhere on the cloud. This raises privacy concerns as well as issues of network bandwidth usage for a user of the mobile device. Also, application developers might be interested in utilizing mobile device sensor data from a large number of devices, but lack either access to the critical mass of mobile devices needed to implement the desired functionality, or lack the resources to utilize a large amount of mobile telephone data.

BRIEF SUMMARY

This Summary is provided in order to introduce simplified concepts of virtual sensor development, which are further described below in the Detailed Description. This summary is not intended to identify essential features of the claimed subject matter, nor is it intended for use in determining the scope of the claimed subject matter.

Virtual sensor architecture according to embodiments provides a library of virtual sensors for use by applications. The virtual sensors include inference models that model various phenomena. The virtual sensors output inferences, or estimations of the modeled phenomena, based on physical sensor input from mobile devices. A Sensor Adaptation Layer (SAL) interfaces between the virtual sensors in the library and physical sensors on multiple mobile devices. An upper SAL resides in the virtual sensor architecture along with the virtual sensor library, while a lower SAL resides on the mobile device. A decision engine provides a virtual sensor learner and a resource arbiter. The decision engine, among other things, provides the SAL with a list of mobile devices to query, and the upper SAL receives the sensor data from the lower SAL residing on the mobile devices and passes the data to the virtual sensor.

The virtual sensor learner of the decision engine is configured to accept test data from one or more test mobile devices along with a corresponding set of training labels. The training labels correspond to the various inference outputs that the virtual sensor is configured to output. Machine learning is utilized to determine an initial inference model based on the test data and the training labels. The virtual sensor learner utilizes machine learning to determine one or more substitute inference models that utilize sensor data types that differ from the sensor data type used by the initial inference model. The substitute inference models may be more accurate and/or may be more energy or resource efficient than the initial inference model. One or more of the initial inference model and the substitute inference models are used to bootstrap the inference models to other devices in order to develop virtual sensors configured to accept physical sensor input from the other mobile devices.

The resource arbiter determines a set of mobile devices from which to receive physical sensor data based on a value of information of obtaining additional sensor data, and based on a plurality of constraints. Matrix splitting reduces the computational complexity of determining the set of mobile devices in consideration of multiple dimensions such as spatial location, temporal frequency, and specific mobile devices. Policy objectives are used to select from amongst two or more determined combinations of mobile devices and temporal frequencies that yield the same or similar estimated accuracy.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
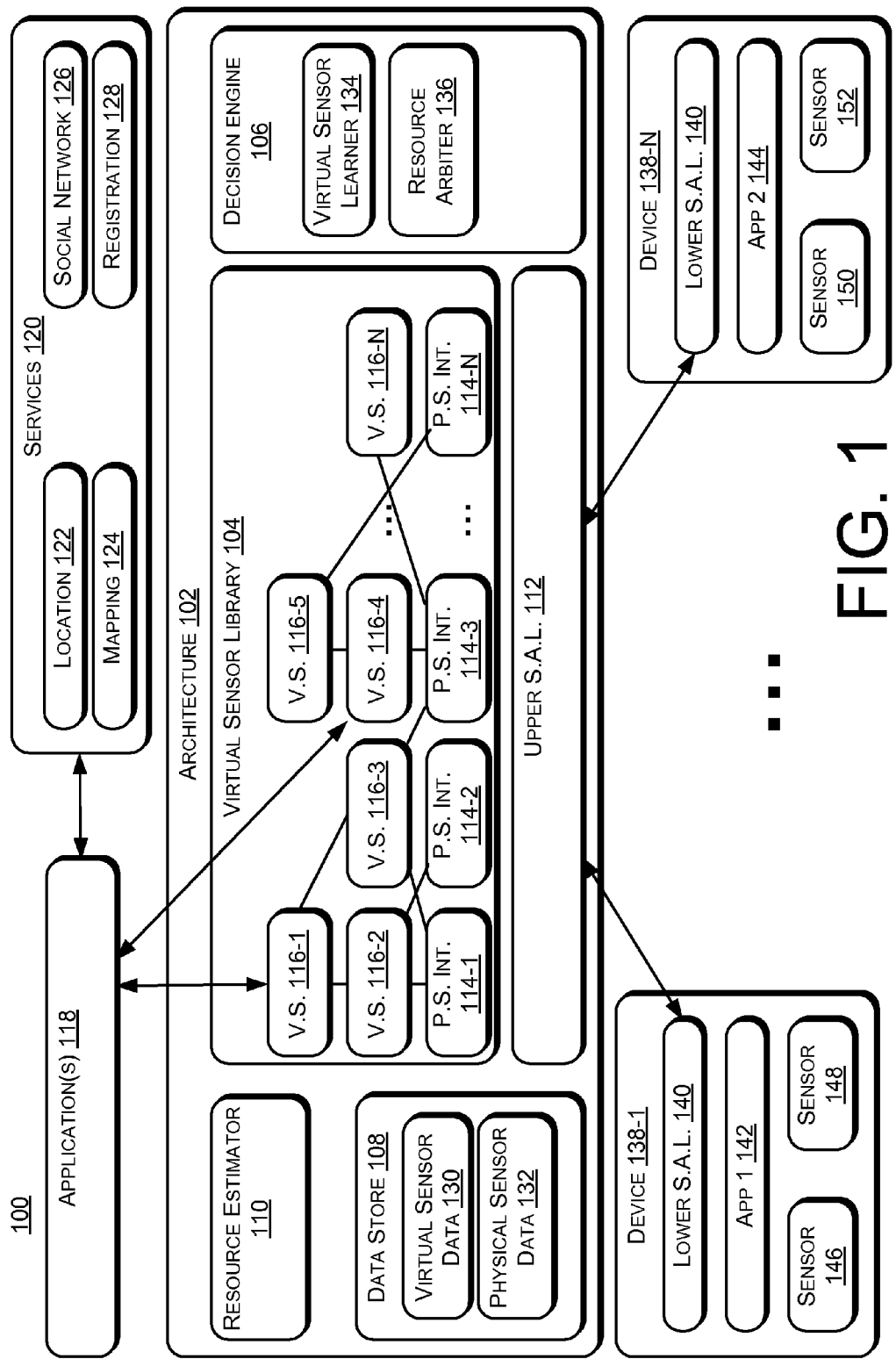
FIG. 1 is a schematic diagram of an example system usable to provide a virtual sensor service.

As discussed above, mobile device applications can utilize sensor data from various sensing modalities on a mobile device, including from remote mobile devices, to perform various functions. Embodiments of the present application include architecture for providing a virtual sensor library in a cloud computing service (the cloud). A virtual sensor includes one or more inference models configured to accept physical sensor data from one or more mobile devices and to output inferences related to modeled phenomena. For example, a virtual sensor might be configured to accept accelerometer and GPS data from various mobile devices to determine the speed at which a mobile device moves, while an application could use such virtual sensor output to determine traffic congestion on a particular highway or street. Another virtual sensor might use accelerometer data to determine whether a particular user is walking, driving, or stationary. Yet another virtual sensor may be configured to determine whether a device is outside or inside a building, a vehicle, etc., using a combination of GPS, microphone, and light sensor data.

The architecture includes a data store to securely and anonymously store virtual sensor data, both current and historical. Historical data provides the ability for virtual sensors or applications to identify useful trends over time. The architecture also includes a sensor abstraction layer (SAL). A portion of the SAL—an upper SAL—resides within the architecture itself and is configured to interface with the virtual sensor library to provide the virtual sensors with physical sensor data from the mobile devices. Another portion of the SAL—the lower SAL—resides on the mobile devices and interfaces with the physical sensors on the mobile device as well as with the upper SAL.

The architecture includes a decision engine. The decision engine includes two components, a virtual sensor learner and a resource arbiter. The virtual sensor learner utilizes machine learning to build an initial inference model based on test sensor data from a set of test devices and inference labels that correspond to the phenomena that the virtual sensor is designed to determine. The initial inference model may be based on a first physical sensor data type (such as GPS, accelerometer, light sensor, or other data type). The virtual sensor learner utilizes additional test data from the set of test devices to develop additional inference models based on other physical sensor data types. One or more of these additional inference models may be selected for the virtual sensor's inference model because they are more accurate, or because they provide other advantages such as lower power or network usage. Finally, the virtual sensor learner bootstraps the various inference models to other devices so that the inference model—and hence the virtual sensor—can utilize data from mobile devices other than those in the set of test devices.

The resource arbiter exploits relationships between mobile devices to determine a subset of a plurality of mobile devices from which to request physical sensor data, as well as the temporal frequencies with which to request the physical sensor data. The resource arbiter selects the subset of mobile devices based on a value of information of sensor data across various domains (such as spatial location, temporal frequency, and specific mobile devices), while meeting a set of constraints on downloading physical sensor data from the plurality of mobile devices. The resource arbiter also enforces various policy objectives, such as a policy to reduce network usage or a policy to reduce mobile device battery or energy usage.

The architecture provides mobile application developers with a cloud-based virtual sensor library and access to the physical sensor data from multiple mobile devices. Application developers can develop virtual sensors for sharing with other developers. That way, application developers can leverage each other's various expertise in developing virtual sensors. Mobile applications can utilize the virtual sensors in the library to perform functions based on physical sensor data from multiple mobile devices at various locations, including mobile devices that do not run the application. Thus, applications that utilize physical sensor data from many different mobile devices can be developed without the requirement that a critical mass of users obtain and execute any one particular mobile application. This provides developers with access to physical sensor data that the developers would find difficult to achieve on their own.

The processes, systems, and devices described herein may be implemented in a number of ways. Example implementations are provided below with reference to the following figures.

Example Environment for a Virtual Sensor Service

FIG. 1 is a schematic diagram of an example system 100 usable to provide a virtual sensor service. Aspects of the system 100 may be implemented on various suitable computing device types that are capable of implementing a virtual sensor service. Suitable computing device or devices may include, or be part of, one or more personal computers, servers, server farms, datacenters, special purpose computers, tablet computers, game consoles, smartphones, combinations of these, or any other computing device(s) capable of storing and executing all or part of a virtual sensor service.

Architecture 102 includes a virtual sensor library 104, a decision engine 106, a data store 108, a resource estimator 110, and an upper sensor abstraction layer (SAL) 112. The virtual sensor library 104 includes one or more physical sensor interfaces 114-1 through 114-N. The physical sensor interfaces 114 interface between the upper SAL 112 and virtual sensors 116-1 through 116-N. The physical sensor interfaces 114 are configured to accept physical sensor data of various types. For example, the physical sensor interface 114-1 may be configured to accept GPS data and the physical sensor interface 114-2 may be configured to accept accelerometer data, and so forth.

The virtual sensors 116 receive physical sensor data from the physical sensor interfaces 114 and/or receive virtual sensor data (i.e., inferences) from other ones of the virtual sensors 116. For example, the virtual sensor 116-1 is configured to receive virtual sensor data from the virtual sensors 116-2 and 116-3. The virtual sensor 116-2, on the other hand, is configured to receive physical sensor data from the physical sensor interfaces 114-1 and 114-2. The virtual sensor 116-5 is configured to receive virtual sensor data from the virtual sensor 116-4 and physical sensor data from the physical sensor interface 114-N.

The application(s) 118 is configured to receive inferences (virtual sensor data) from one or more of the virtual sensors 116. The application(s) 118 may also be configured to receive physical sensor data from one or more of the physical sensor interfaces 114. The application(s) 118 may be configured to receive data from one or more of the services 120, such as location service 122, mapping service 124, social network service 126, registration and notification service 128, and so forth. The application(s) 118 may be configured to utilize combinations of these various services, virtual sensor data, and physical sensor data to provide functionalities.

Decision engine 106 includes a virtual sensor learner 134 and a resource arbiter 136. The virtual sensor learner 134 performs various functions with respect to developing the virtual sensors 116. The virtual sensor learner 134 utilizes machine learning to develop an initial inference model based on test sensor data from a set of test devices and labels for the test sensor data. The virtual sensor learner 134 utilizes machine learning to develop alternative inference models using alternative test sensor data from the set of test devices. These alternative inference models may be more accurate than the initial inference model, or may have some other advantage such as reduced network or power usage. One or more of the inference models may be combined together to form an inference model that has improved accuracy or other improved characteristic. The virtual sensor learner 134 is also configured to bootstrap the inference models to other mobile devices so that the virtual sensors 116 are able to accept sensor data input from the other mobile devices. This bootstrapping allows a developer to develop a virtual sensor capable of receiving sensor data from many different mobile devices using only a small set of test devices. More information regarding the operation of the virtual sensory learner 134 can be found elsewhere within this Detailed Description.

The resource arbiter 136 determines subsets of mobile devices from which to collect sensor data. The virtual sensors 116, including those developed by virtual sensor learner 134, may be configured to accept any and all physical sensor data that are made available to it. But using all available sensor data could result in unsustainable network usage, unacceptable battery usage, or enhanced privacy concerns on the part of users. Thus, the resource arbiter 136 controls physical sensor data upload in order to meet various constraints. The resource arbiter 136 utilizes a value of information for physical sensor data in three dimensions: spatial locations, specific mobile devices, and temporal frequency. The resource arbiter 136 utilizes relationships amongst the mobile devices as well as constraints on sensor data upload (such as network usage constraints, battery usage constraints, and user privacy constraints), to determine a subset of mobile devices and a temporal frequency for sensor data upload. The resource arbiter 136 utilizes functions to reduce the computational complexity of utilizing value of information in multiple dimensions as will be discussed in more detail elsewhere within this Detailed Description.

Data store 108 includes virtual sensor data 130 and physical sensor data 132. In embodiments, personally-identifying information is either not uploaded from the mobile device along with the physical sensor data, is not permanently stored, or is not made available to the virtual sensors 116 or the application(s) 118. The physical sensor data may be stored with an anonymous identifier that identifies the physical sensor data as coming from the same device, but that does not readily identify the device itself or the user associated with the device. Also, embodiments may provide users with either opt-in or opt-out consent to allow their sensor data to be collected. With opt-in consent, the user takes an affirmative action before the sensor data is collected. With opt-out consent, the user can take an affirmative action to prevent the collection of the sensor data before that data is collected. Also, in various embodiments, users may control the frequency with which their sensor data is uploaded. And users may be provided with options to specify various spatial locations where their mobile devices will not share sensor data. Users may be provided with a user interface on their mobile devices, and/or a web-based interface to control their privacy settings, including the upload of sensor data from their devices. Data store 108 includes various security features such as access restrictions and encryption to ensure that the data is not accessed by unauthorized devices or people. Although users' mobile device sensor data is shared within the system 100, the users benefit by being able to access application(s) 118 that provide enhanced features that would be difficult, expensive, or impossible to provide without access to many users' sensor data.

The resource estimator 110 provides estimates of the amount of resources required by one or more of the virtual sensors 116. The application(s) 118 may offer incentives to users for collecting data from their mobile devices (such as access to application functionality in exchange for sharing their sensor data). The resource estimator 110 provides estimates of the uncertainty in inferred outputs and possible uncertainty reduction possible with varying amounts of additional data collection. This estimation process allows, for example, application developers to determine the extent of data collection required and may also influence user's willingness to contribute data.

Mobile devices 138-1 through 138-N include a lower SAL 140, configured to communicate with the upper SAL 112 to provide physical sensor data. The mobile devices 138 include various mobile applications, such as applications 142 and 144. Applications 142 and 144 may be the same as application(s) 118, or they may be different. Applications 142 and 144 may be configured to utilize virtual sensor outputs to provide various functions. Applications 142 and 144 may be configured to interface with application(s) 118 to provide such functions.

Mobile device 138-1 includes physical sensors 146 and 148, and mobile device 138-N includes physical sensors 150 and 152. These physical sensors provide the physical sensor data to the lower SAL 140. The lower SAL 140 allows the mobile devices 138 to participate in the system 100. It allows their respective sensors to upload sensor data to the virtual sensor library 104. It also allows them to benefit from mobile applications whose functions rely on physical sensor data from other mobile devices, even if those mobile devices do not run the same mobile applications.

Example Computing Device for Virtual Sensor Service

Figure 2:
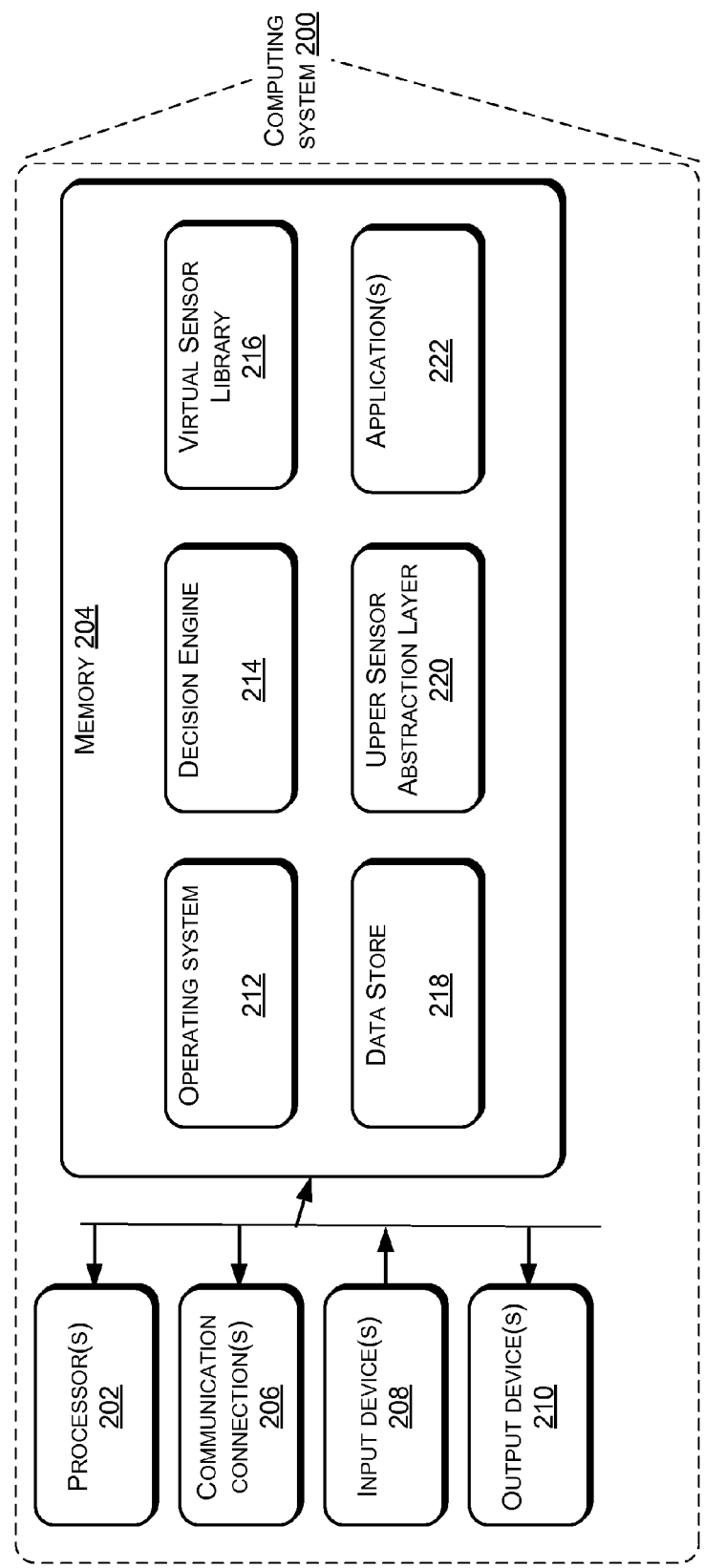
FIG. 2 is a block diagram of an example computing system usable to provide a virtual sensor service according to embodiments.

FIG. 2 is a block diagram of an example computing system usable to provide a virtual sensor service according to embodiments. The computing system 200 may be configured as any suitable computing device capable of implementing virtual sensor service. According to various non-limiting examples, suitable computing devices may include personal computers (PCs), servers, server farms, datacenters, special purpose computers, tablet computers, game consoles, smartphones, combinations of these, or any other computing device(s) capable of storing and executing all or part of a virtual sensor service.

In one example configuration, the computing system 200 comprises one or more processors 202 and memory 204. The computing system 200 may also contain communication connection(s) 206 that allow communications with various other systems. The computing system 200 may also include one or more input devices 208, such as a keyboard, mouse, pen, voice input device, touch input device, etc., and one or more output devices 210, such as a display, speakers, printer, etc. coupled communicatively to the processor(s) 202 and memory 204.

Memory 204 may store program instructions that are loadable and executable on the processor(s) 202, as well as data generated during execution of, and/or usable in conjunction with, these programs. In the illustrated example, memory 204 stores an operating system 212, which provides basic system functionality of the computing system 200 and, among other things, provides for operation of the other programs and modules of the computing system 200.

Memory 204 includes a decision engine 214, which may be the same as or similar to the decision engine 106. Memory 204 includes a virtual sensor library 216, which may be the same as or similar to the virtual sensor library 104. Memory 204 includes data store 218, which may be the same as or similar to data store 108. Memory 204 includes an upper SAL 220, which may be the same as or similar to upper SAL 112. Memory 204 includes application 222, which may be the same as or similar to application(s) 118.

Example Computing Device for Mobile Device

Figure 3:
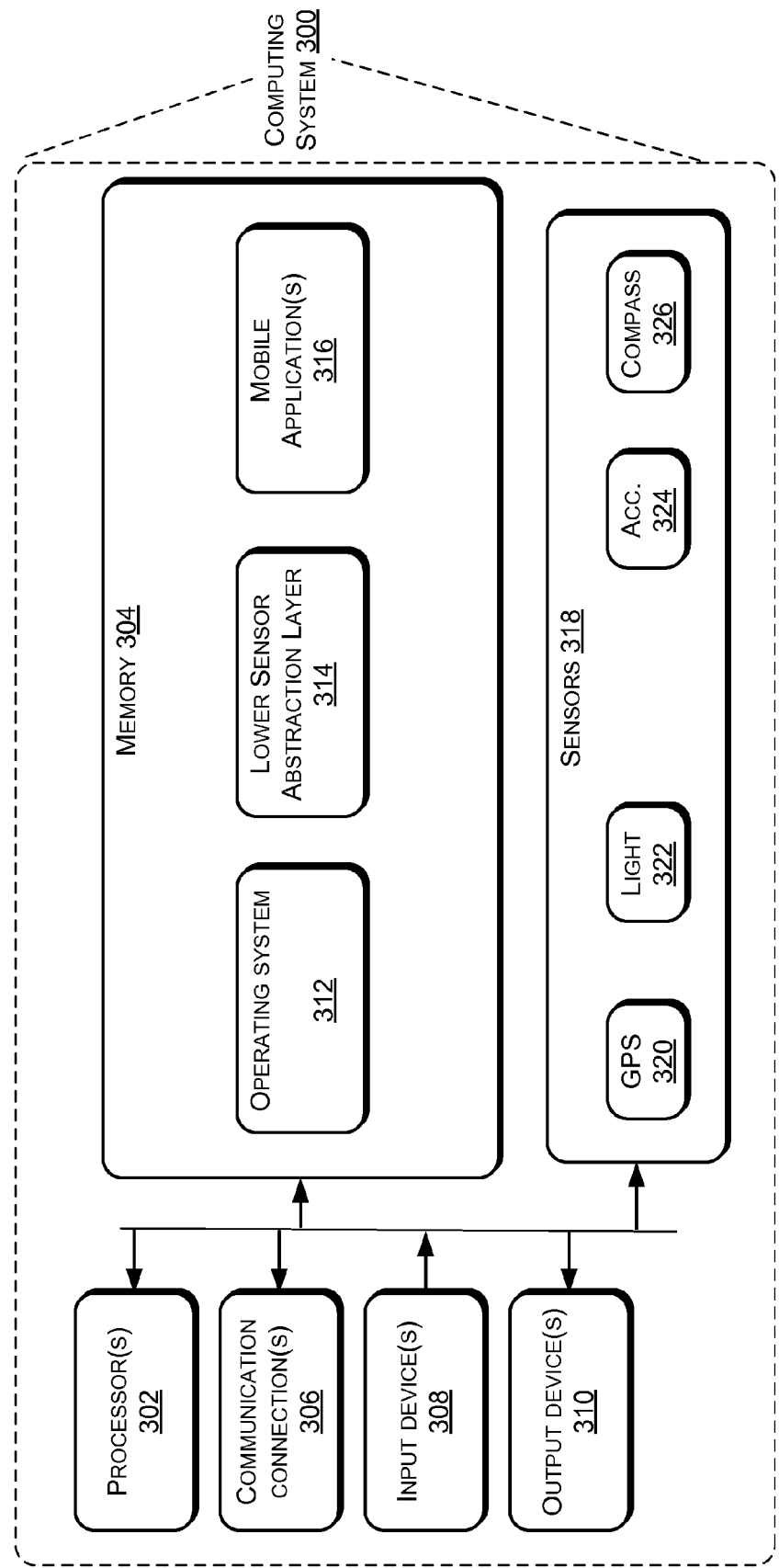
FIG. 3 is a block diagram of an example computing system usable to provide a mobile device according to embodiments.

FIG. 3 is a block diagram of an example computing system usable to provide a mobile device according to embodiments. The computing system 300 may be configured as any suitable computing device capable of implementing a mobile device. According to various non-limiting examples, suitable computing devices may include personal computers (PCs), servers, server farms, datacenters, special purpose computers, tablet computers, game consoles, smartphones, combinations of these, or any other computing device(s) capable of storing and executing all or part of a mobile device.

In one example configuration, the computing system 300 comprises one or more processors 302 and memory 304. The computing system 300 may also contain communication connection(s) 306 that allow communications with various other systems. The computing system 200 may also include one or more input devices 308, such as a keyboard, mouse, pen, voice input device, touch input device, etc., and one or more output devices 310, such as a display, speakers, printer, etc. coupled communicatively to the processor(s) 302 and memory 304.

Memory 304 may store program instructions that are loadable and executable on the processor(s) 302, as well as data generated during execution of, and/or usable in conjunction with, these programs. In the illustrated example, memory 304 stores an operating system 312, which provides basic system functionality of the computing system 300 and, among other things, provides for operation of the other programs and modules of the computing system 300.

Memory 304 includes a lower SAL 314, which may be the same as or similar to lower SAL 140. Memory 304 includes mobile application(s) 316, which may be the same as or similar to mobile applications 142 and 144.

Computing system 300 includes sensors 318, which may be the same as or similar to physical sensors 146-152. Non-limiting examples of sensors 318 include GPS sensor 320, light sensor 322, accelerometer 324, and a compass 326. Also, the lower SAL 314 may treat communication connections 306 as a type of sensor. Physical sensor data from communication connections 306 may include a network address or other sensor data type.

Decision Engine

Figure 4:
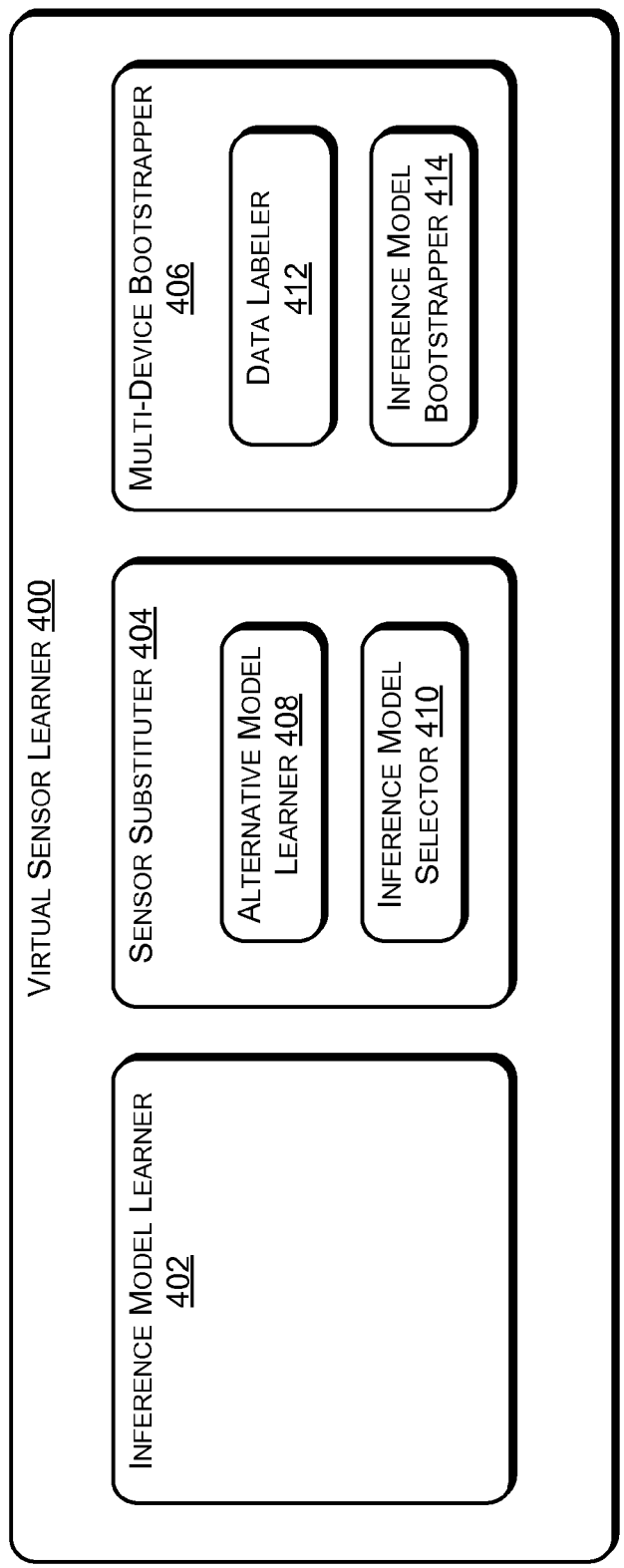
FIG. 4 is a block diagram of a virtual sensor learner according to embodiments.

FIG. 4 is a block diagram of a virtual sensor learner according to embodiments. The virtual sensor learner 400 may be the same as or similar to the virtual sensor learner 134. The virtual sensor learner 400 includes inference model learner 402, sensor substituter 404, and multi-device bootstrapper 406.

The inference model learner 402 is configured to receive test physical sensor data from a set of test mobile devices, or even just a single test device, as well as desired training labels that correspond to each value of the test physical sensor data. The inference model learner 402 may also receive features computed from the test physical sensor data. Features are computations performed on the test physical sensor data. In one non-limiting example, a virtual sensor designed to determine whether a user of a mobile device is driving or walking is configured to receive physical sensor data including GPS coordinate data, and features that include a "difference in adjacent values" computed from the GPS coordinate data. The "difference in adjacent values" effectively yields a speed of the device. In embodiments, the features may be omitted if raw sensor data is to be used directly for inference. In other embodiments the inference model learner 402 may utilize a set of default features for all raw data input and, based on inference quality, select a set of appropriate features. The training labels correspond to the inferences—that is, the virtual sensor data—that the virtual sensor under construction is designed to output. For example, a virtual sensor designed to determine whether a mobile device is indoors (e.g., in a building, in a vehicle, etc.) or outdoors, may be developed using training labels such as "indoors" and "outdoors."

The inference model learner 402 develops an initial inference model that can receive physical sensor data, or related features, and output the inferred state based on the training labels ("indoors" or "outdoors" as in one of the above examples). The inference model learner 402 utilizes machine learning methods to learn the initial inference model, such as for example Gaussian Process Regression (GPR).

In some embodiments, other machine learning methods may be employed instead of GPR. The resulting inference models can exist alongside with the inferences that use GPR. But some of the methods utilized by the sensor substituter 404 and the multi-device bootstrapper 406 may not apply to the inference models that result from such non-GPR machine learning methods.

The sensor substituter 404 accepts as input the initial inference model, as well as alternative data from the set of test mobile devices. Because the alternative data from the set of test mobile devices corresponds to the original test sensor data that was used to determine the initial inference model, alternative model learner 408 within the sensor substituter 404 can utilize machine learning—such as GPR—to learn additional inference models based on the initial inference model. For example, GPS data may be used to develop the initial inference model, and accelerometer data may be used to develop an alternative inference model. The sensor substituter 404 may maintain information correlating the GPS data and the accelerometer data so that the sensor substituter 404 can learn a new inference model that accurately determines the inferences using the accelerometer data.

In embodiments, a first type of sensor data and a second type of sensor data may be obtained at the same time. Thus, it can be assumed that both types of sensor data were sensed while the mobile device was experiencing the same phenomena (driving, walking, outdoors, indoors, stuck in traffic, and so forth). The temporal relationship between the data can be exploited to develop the substitute inference models. As the first data type is run through the first inference model, the resulting inferences can be used as training labels for learning the substitute inference models based on the second data type (in one example). (In addition to this method for developing a substitute inference model, other methods from the field of semi-supervised learning can also be applied to develop substitute or joint inference models.) The additional inference models may be more efficient or more accurate (or both) than the initial inference model.

The additional inference models are configured to use different types of physical sensor data and/or different features computed from the same or different physical sensor data. In one example, the initial inference model for a virtual sensor designed to determine if a mobile device is indoors or outdoors may utilize GPS data. But an alternative inference model may utilize light sensor data in conjunction with accelerometer data to achieve a virtual sensor that is sufficiently accurate at determining indoor/outdoor inferences. Such an alternative inference model may require less battery power on the part of a mobile device than does the initial inference model based on GPS sensor data. An inference model selector 410 may select from amongst the various alternative inference models based on either a requirement to improve or substantially maximize inference model accuracy, or on some other requirement such as to improve or substantially minimize battery usage.

As noted above, the inference model selected by the inference model selector 410 may improve accuracy. For example, the initial inference model M1 can be combined with one or more of alternative inference models M2, . . . , Mn. GPR-based models capture the key model and data characteristics (correlations among data and uncertainties) using a covariance matrix, often referred to as a kernel matrix. The combined kernel matrix that captures one or more of the inference models jointly can be computed as:

$$K_c = \left[\sum_j (K_j + \delta_j^2 I)^{-1}\right]^{-1}$$

Where Kc is the combined inference model and the individual kernels (from M1, ..., Mn) are Kj, and the summation, are over all n, where I represents an identity matrix $\delta_j$, represents the weight coefficients for inference model j. Different models may be assigned different weights based on their confidence level or accuracies. The combined inference model may yield better accuracy than the initial inference model and/or individual ones of the alternative inference models.

As noted above, the selected model may improve energy (or other resource) use. For many applications, the accuracy of some of the individual models M1, ..., Mn may suffice. In that case, the inference model selector 410 chooses the most energy (or other resource) efficient inference model that has sufficient accuracy. For instance, M1 may use GPS sensor data, while M2 may use accelerometer sensor data. If both M1 and M2 yield satisfactory accuracy, then M2 may be chosen for use in the virtual sensor due to the accelerometer having greater energy efficiency than the GPS sensor.

The inference model learner 402 and the sensor substituter 404 yield inference models M1 through Mn that are configured to accept sensor data of various types from the set of test devices. The multi-device bootstrapper 406 is configured to bootstrap these inference models to other mobile devices so that the virtual sensor can utilize sensor data from these other mobile devices.

A data labeler 412 is configured to utilize one or more of models M1 through Mn on unlabeled training data from other mobile devices. The data labeler 412 may also receive an indication, such as may be provided by the developer, regarding the types of sensors that are applicable to other mobile devices. This indication may be used to determine which of M1 through Mn are used by the data labeler 412. The data labeler 412 accepts the unlabeled training data from the other mobile device as input into one or more of M1 through Mn, and outputs inferences (estimated labels) and confidence values associated with those inferences.

The inference model bootstrapper 414 accepts as input the inferences output from the data labeler 412, as well as the confidence values, and utilizes semi-supervised machine learning to adapt the inference model from a single mobile device to multiple mobile devices. The inference model bootstrapper 414 uses those inferences that have associated high confidence values (e.g., uncertainties below a selected threshold) to learn the additional sensor models M2-new, M3-new ... Mn-new, for the other mobile device. The inference model bootstrapper 414 repeats this process for each of the other mobile devices.

The inference models may be different for each mobile device. For instance, with reference to a virtual sensor designed to determine a transport mode (such as walking, driving, or stationary), accelerometer data characteristics for one mobile device that is frequency carried in a user's pocket may be different from accelerometer data characteristics from another mobile device that is frequently carried in a handbag. Thus their respective inference models may be different. A developer only needs to provide training data for one device (or small group of devices) and the virtual sensor learner 400 learns related inference models for other devices by exploiting relationships between multiple sensors to evolve the inference models from one device to another. The end result is that this process automatically yields inference models across many mobile devices. These inference models become part of a virtual sensor. Thus, a virtual sensor may include multiple inference models, one for each mobile device, or one for each of various subsets of mobile users.

Figure 5:
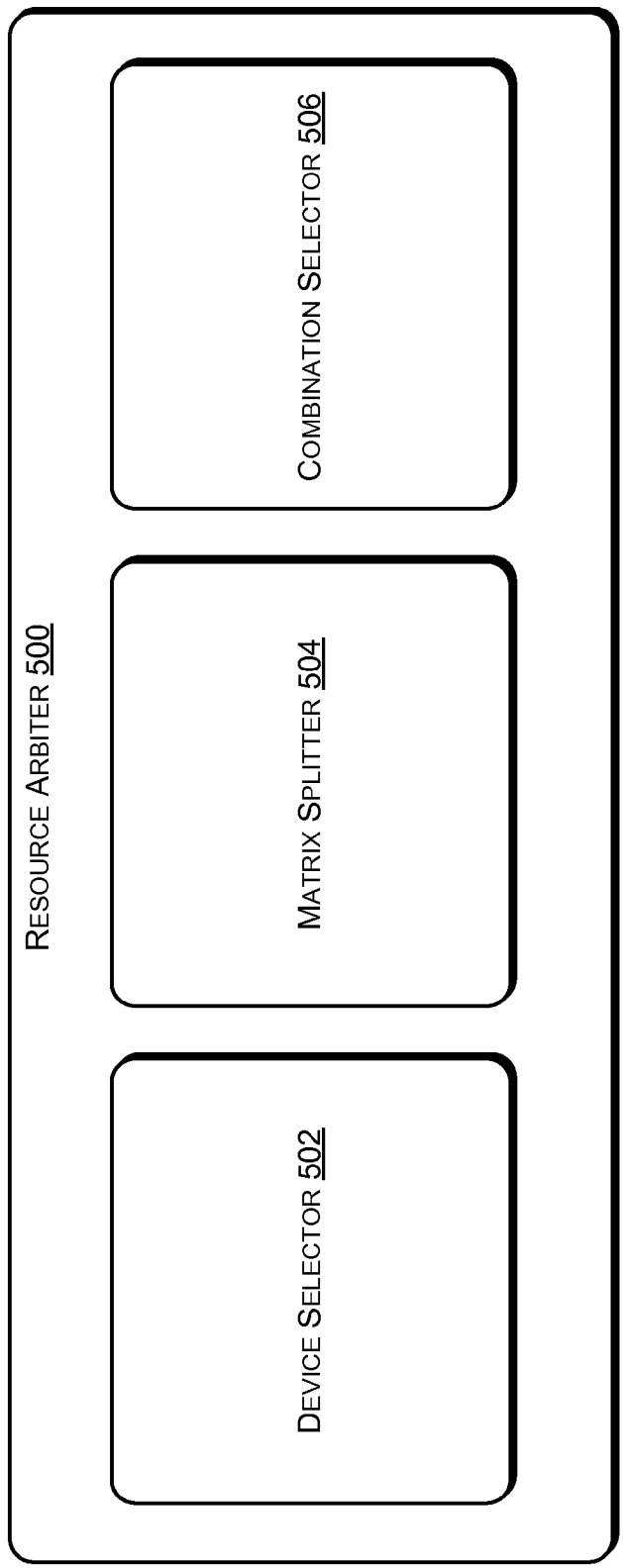
FIG. 5 is a block diagram of a resource arbiter according to embodiments.

FIG. 5 is a block diagram of a resource arbiter according to embodiments. The resource arbiter 500 may be the same as or similar to the resource arbiter 136. The resource arbiter 500 includes device selector 502, matrix splitter 504, and combination selector 506.

The virtual sensors, such as virtual sensors 116 learned by the decision engine 106, are configured to accept physical sensor data from a plurality of mobile devices and to output inferences for those mobile devices. The virtual sensors may be configured to accept as much physical sensor data, and from as many mobile devices, as is made available. But the virtual sensors may provide sufficient accuracy with fewer than all available mobile devices, especially as the number of mobile devices becomes large. As mentioned previously, constraints may be placed on the amount of physical sensor data that is uploaded. These constraints include, but are not limited to, network bandwidth constraints, energy and/or battery usage constraints, and privacy constraints. These constraints place limits on the numbers of devices that can be queried for sensor data at any given time, as well as limits on the temporal frequency at which sensor data can be uploaded from mobile devices. The resource arbiter 500 determines, based on the constraints, the particular mobile devices and upload temporal frequencies to be used for providing physical sensor data to the virtual sensor.

The device selector 502 is configured to exploit similarities and dependencies between multiple devices to select the most informative mobile devices. For instance, if two users work in the same office building, then certain sensor data may only be sensed from one of them. This does not significantly impact the usefulness of the physical sensor data because both mobile devices will be, at certain times, in substantially the same spatial location. This results in less network bandwidth overhead because only one mobile device uploads data. It also reduces battery or other resource usage (such as device memory or processor usage) because only one mobile device at a time will spend battery power to operate the sensor and upload its data.

In another example, if two users work complimentary shifts at a store, then sensing one user's mobile device may indicate that the other user's mobile device is not present at the store, meaning that the other user's mobile device need not be sensed to determine that it is not present at the store. Multiple such patterns may exist based on shared working hours, shared living locations, familial or business relationships, time zone differences, and so forth. Such patterns can be used to select mobile devices from which to retrieve sensor data, in consideration of multiple dimensions: such as the spatial locations to be sensed, the specific mobile users to be sensed, and the time intervals at which sensor data are collected.

U.S. Pat. No. 7,818,412, entitled "Selection of Sensors for Monitoring Phenomena Considering the Value of Information and Data Sharing Preferences," the entirety of which is hereby incorporated by reference for all purposes, describes how sensors can be selected for sensing across multiple spatial locations. In U.S. Pat. No. 7,818,412, a value of information is determined for receiving data that corresponds to a segment of a model of phenomena. The value of information is related to the estimated reduction of uncertainty achieved with additional sensor data and the demand placed on the sensor data, the phenomena model, or the segment of the phenomena model. The reduction in uncertainty is estimated using the phenomena model. User-defined preferences (such as sensor data upload frequency and restrictions on uploading data while the user is present at certain locations) are modeled as non-negative costs. A selector component selects sensors based on the value of information and the non-negative costs associated with acquiring additional information from particular devices/sensors.

The device selector 502 utilizes methods that are similar to the methods described in U.S. Pat. No. 7,818,412 to determine a value of information and to select mobile devices to sense from based on constraints modeled as non-negative costs. The methods described in U.S. Pat. No. 7,818,412 include methods to select sensors based on a spatial location dimension. The device selector 502 according to embodiments of the present disclosure uses similar methods to select mobile devices taking into account the spatial location dimension plus additional dimensions such as the specific mobile users to be sensed, and the time intervals at which sensor data are collected. Considering multiple dimensions alters the covariance matrices used by the methods in U.S. Pat. No. 7,818,412. Selecting sensors across multiple dimensions, and selecting from amongst a large number of sensors, introduces two complications: increased computational complexity and selecting from amongst multiple combinations.

The matrix splitter 504 utilizes diagonalization and pruning to reduce the computational complexity of considering multiple mobile devices and multiple dimensions. The size of covariance matrices involved in GPR (and other related methods according to embodiments) increases with the number of mobile devices being considered. The size of the matrix directly impacts the computational complexity. Thus, the matrices may become difficult for a given computational technology to process. To reduce the computational complexity, the matrix splitter 504 splits the matrices using diagonalization and pruning.

In diaogonalization, the rows and columns of the covariance matrices are rearranged so that the most correlated values (e.g., high values of data in the matrix) are close to each other, and often close to the diagonal of the matrix. In pruning, values in the covariance matrix that are below a threshold, T, are set to zero. The large matrix is then split into small matrices such that only those rows and columns that have non-zero values remain within the small matrices. Choosing a lower threshold value for T results in fewer values being pruned to zero, thereby resulting in larger matrices after the split. The value of T can therefore be increased based on the available computing resources available.

When scheduling mobile device sensor upload across multiple dimensions, such as multiple mobile devices and multiple time instances, there often exist multiple combinations of mobile devices and temporal frequencies that yield the same (or similar or sufficient) inference accuracy. In one non-limiting example where there are a hundred available mobile devices, the same average accuracy of inference over a day can be achieved by sampling 20 mobile devices every hour, or by sampling 40 mobile devices every two hours. The combination selector 506 chooses from amongst multiple combinations of mobile devices and temporal frequencies in a manner that meets desired objectives.

An example objective is to minimize network overhead. In this example, the combination selector 506 schedules collection of more frequent samples from a relatively small number of users. Thus, the combination selector 506 would select a combination that samples from 20 mobile devices every hour rather than from 40 mobile devices but only once every two hours.

Another example objective is to minimize the battery drain on individual mobile devices. In this example, the combination selector 506 selects a strategy where a relatively large number of users contribute data, but each one contributes data relatively infrequently. Thus, the combination selector 506 selects a combination that samples from 40 mobile devices but only once every two hours rather than from 20 mobile devices every hour. In embodiments, certain mobile devices that have relatively more spare battery capacity, such as due to lower local use or more frequent charging, may be selected in preference over other devices with relatively less spare battery capacity.

Exemplary Operations for Developing a Virtual Sensor

Figure 6:
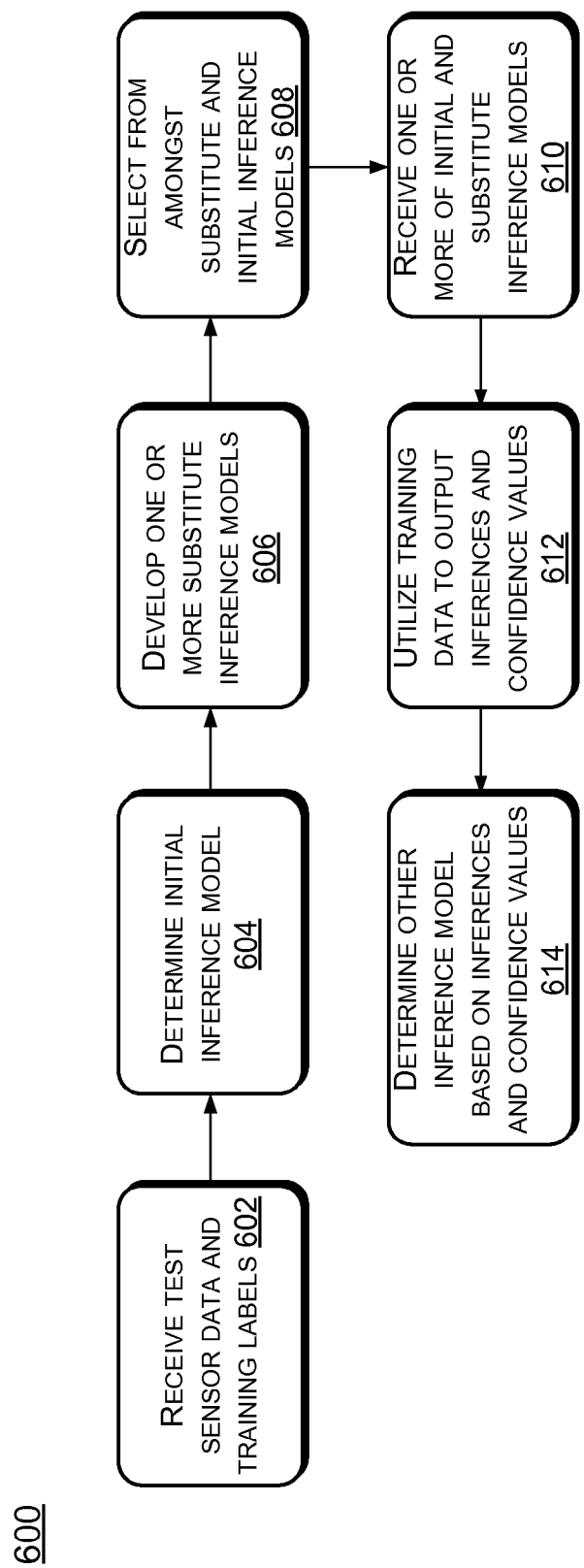
FIG. 6 is a flow diagram showing an example process for developing a virtual sensor according to embodiments.

FIG. 6 is a flow diagram showing an example process 600 for developing a virtual sensor according to embodiments. Process 600 may be run on a virtual sensor learner, such as virtual sensor learner 134. At 602, test sensor data from a set of one or more test mobile devices, along with associated training labels, are received. The virtual sensor will be developed such that it includes one or more inference models, the inference models configured to accept physical sensor data as input and to output inferences that represent predictions or estimates of a physical phenomenon based on the physical sensor data. The associated training labels represent the various inferences or predictions that the inference models make. In one non-limiting example, an inference model designed to infer whether a mobile device is indoors or outdoors is built using test data and associated training labels such as "outdoors" and "indoors." A developer may provide the test sensor data and the associated training labels. The developer correlates the test sensor data values with the appropriate training labels. Thus, referring to the non-limiting example above, a particular test sensor data value is associated with a label of either "indoors" or "outdoors," depending on observations of whether the physical sensor data was produced while the device was indoors or outdoors.

At 604, machine learning is utilized to determine an initial inference model based on the test sensor data and the associated training labels. Machine learning methods to learn the initial inference model include Gaussian Process Regression (GPR).

At 606, machine learning (such as GPR) is utilized to develop one or more substitute inference models based on the initial inference model. As discussed above, the initial inference model is configured to accept a first type of sensor data from the test set of mobile devices, and to output inferences that are based on the first type of sensor data. A substitute inference model is configured to accept a second type of sensor data from the test set of mobile devices and to output the inferences based on the second type of sensor data. The machine learning at 606 utilizes a relationship between the first type of sensor data and the second type of sensor data. For example, the first type of sensor data is associated with the initial inference model. The second type of sensor data may be collected/sensed at the same time and on the same mobile device. Thus, the inferences from the initial inference model can be used as training labels for the substitute inference model learned at 606.

In one non-limiting example, the first type of sensor data may be GPS data and the second type of sensor data may be accelerometer data. The GPS data and the accelerometer data may both be sensed at the same or similar time and therefore have a known temporal relationship to one another that allows inferences from the GPS-based initial inference model to be used as training labels for the accelerometer-based substitute inference model. Where multiple substitute inference models are learned, various other types of sensor data are used to train those inference models. For example, a second substitute inference model may be trained using light sensor data and a third substitute inference model may be trained using network connection data. One or more of the substitute inference models may be combined, in embodiments, to obtain yet another type of substitute inference model. The combined inference model may yield better accuracy than any of the individual initial and substitute inference models.

At 608, an inference model is selected from amongst the set of substitute inference models and the initial inference model. The selection may be based on relative accuracies of the substitute inference models and the initial inference model. Alternatively, the selection may be based on relative energy usages of the substitute inference models and the initial inference model, or selected based on other criteria. Some combination of accuracy, energy usage, or other criteria may be used to select the inference model. Energy usage refers to, in various embodiments, mobile device battery usage that is required to operate a particular sensor type. For example, a GPS sensor may require more battery power to operate within a particular mobile device than does an accelerometer. Thus, in this example, if the initial inference model is based on GPS data, and one of the substitute inference models is based on accelerometer data, then the accelerometer-based substitute inference model may be selected to reduce energy usage (assuming that the accelerometer-based substitute inference model is sufficiently accurate).

At 610, one or more of the initial inference model and substitute inference models (such as for example the inference model selected at 608) is received by a multi-device bootstrapper, such as the multi-device bootstrapper 406. As noted above, the initial inference model and the substitute inference models are configured to accept physical sensor data from the test set of mobile devices. The purpose of the multi-device bootstrapper is to use one or more of the initial and substitute inference models from the test set of mobile devices to develop other inference models for other mobile devices.

At 612, the one or more of the initial inference model and the substitute inference models are utilized to output a set of inferences and associated confidence values based on training data from another mobile device. The other mobile device is different from the test set of mobile devices. But the type of training data from the other mobile device is the same type as the type of data used in the one or more of the initial inference model and the substitute inference models. For example, if the inference model used at 612 is based on GPS data (raw data or features), then the training data from the other mobile device will also be based on GPS data (raw data or features).

At 614, the set of inferences and associated confidence values are utilized to determine one or more other inference models configured to accept other sensor data from the other mobile device, and to output other inferences based on the other sensor data. In embodiments, this may involve using semi-supervised machine learning (using GPR for example), and it may utilize those inferences from 612 that have relatively high associated confidence values. A virtual sensor may include inference models for many different mobile devices. Thus, training data from multiple mobile devices may be utilized to bootstrap inference models specific to those mobile devices for use by the virtual sensor. A type of mobile device will not always be useful for determining an applicable inference model. For example, two users with the same type of mobile device may have very different inference models for determining a mode of transportation if one of those users has a smooth-shifting automatic transmission car and carries their mobile device in a handbag when walking, while the other user drives a manual transmission and carries their phone on their belt when walking.

Process 600 allows a developer to provide test data from a small set of test devices (or perhaps even just one test device), and to utilize that small set of test data to determine inference models for a very large number of mobile devices. This allows the developer to create a virtual sensor that can leverage data from a large number of mobile devices.

Exemplary Operations for Selecting Mobile Devices for Data Sensing

Figure 7:
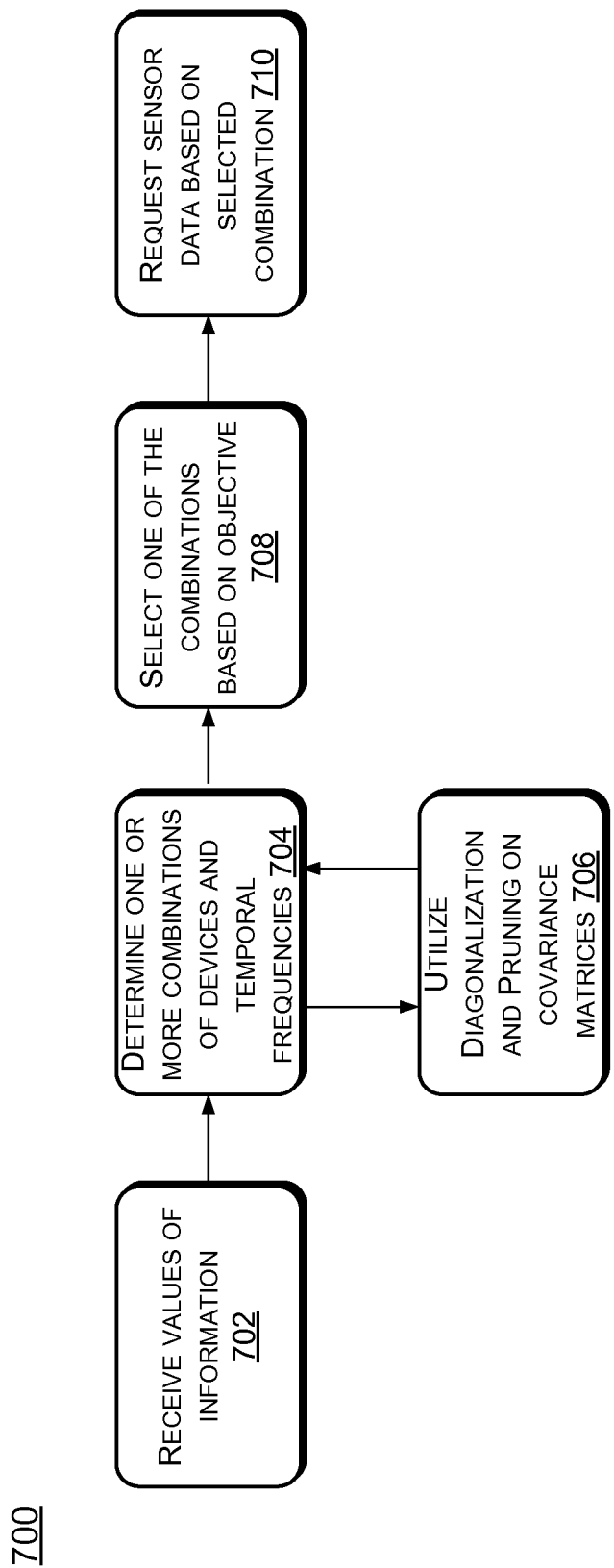
FIG. 7 is a flow diagram showing an example process 700 for selecting a set of mobile devices from which to sense data according to embodiments.

FIG. 7 is a flow diagram showing an example process 700 for selecting a set of mobile devices from which to sense data according to embodiments. Process 700 may be run on a resource arbiter, such as resource arbiter 136. At 702, the resource arbiter receives a plurality of values of information indicating a benefit of an inference model receiving additional sensor data from a plurality of mobile devices. The plurality of values of information may include a value of information indicating an estimated decrease of uncertainty if a specific mobile device is sensed. The value may also indicate a demand for the particular sensor data.

At 704, the resource arbiter determines, based on relationship patterns between the plurality of mobile devices, and based on the plurality of values of information, one or more combinations of mobile devices and sensing temporal frequencies that meet a plurality of constraints associated with receiving sensor data from the plurality of mobile devices. The plurality of constraints may include constraints on time intervals that the plurality of mobile devices can be sensed from. The plurality of constraints may include constraints on the spatial locations at which the plurality of mobile devices can be sensed from. The relationship patterns between the various mobile devices may include one or more of shared working hour patterns, shared living location patterns, familial or business relationship patterns, and time zone patterns of users associated with the various mobile devices.

At 706, covariance matrix splitting—including diagonalization and pruning—is used to reduce a computational complexity of the determining of the one or more combinations. Pruning and diagonalization are described in more detail elsewhere within this Detailed Description.

At 708, one of the one or more combinations is selected based on an objective. More than one combination may be determined at 704, indicating that two or more combinations of mobile devices and device frequencies would yield the same or similar accuracy of inferences produced by the inference model. In that case, an objective is used to choose one of the combinations. Example objectives include an objective to reduce network usage, or an objective to reduce mobile device battery usage.

At 710, sensor data is requested from individual ones of the plurality of mobile devices at time intervals according to a selected one of the one or more combinations. In this way, the resource arbiter suppresses sensor data download, in order to meet various constraints, as noted above. Thus, overall network bandwidth can be reduced, privacy concerns of the users can be addressed, overall battery usage can be reduced, and/or other constraints and/or objectives addressed. System objectives differ from the constraints in that the constraints are used to determine one or more combinations of mobile devices and upload time intervals. The system objectives are used to choose between two or more combinations that produce equally accurate, or similarly accurate, results. Thus, constraints are used to determine the combinations, and objectives are used to choose from amongst determined combinations that have the same or similar predicted accuracies.

Exemplary Operations for Providing Virtual Sensors

Figure 8:
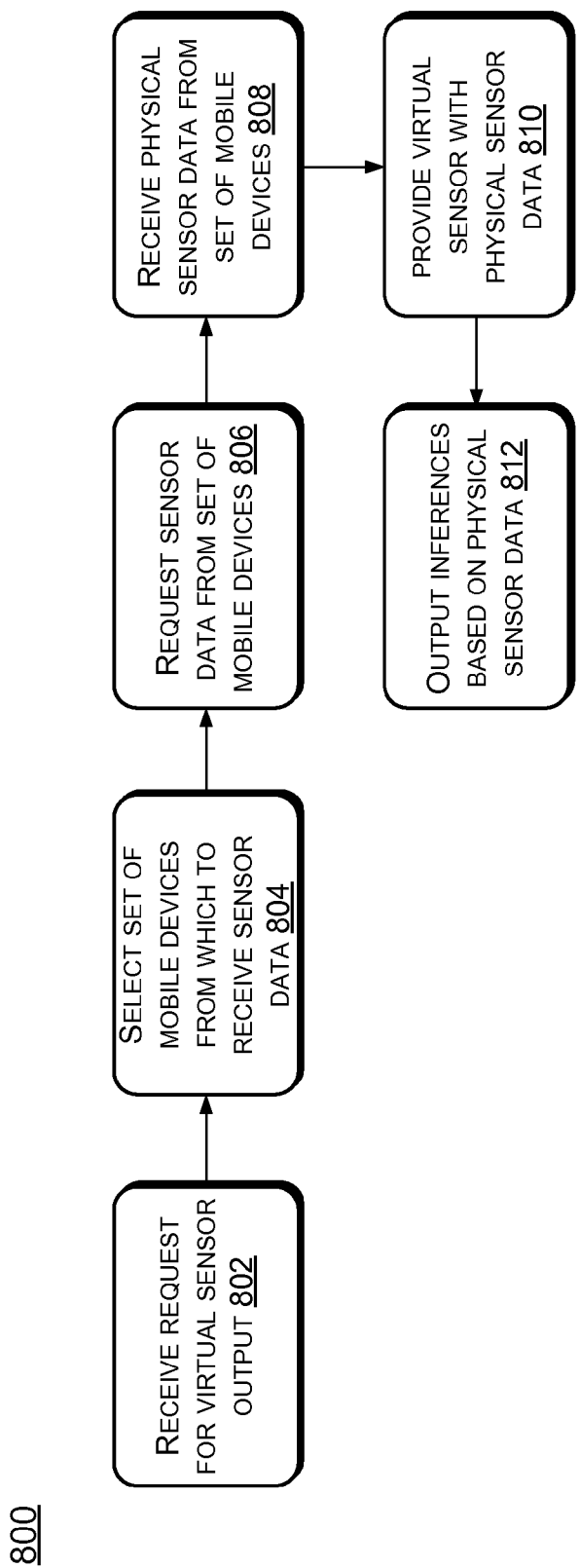
FIG. 8 is a flow diagram showing an example process 800 for providing applications with virtual sensor data according to embodiments.

FIG. 8 is a flow diagram showing an example process 800 for providing applications with virtual sensor data according to embodiments. Process 800 may be run on virtual sensor architecture, such as architecture 102. At 802, the virtual sensor architecture receives a request from an application for virtual sensor inference output. The application may be a web-based application, hosted on a network such as the Internet. Alternatively, the application may be a mobile device application executable by a mobile device. The virtual sensor inference output is based on inference models configured to receive physical sensor data from a plurality of mobile devices and/or virtual sensor inference output from one or more other virtual sensors.

At 804, a decision engine—such as decision engine 106—may select a set of mobile devices from which to receive physical sensor data relevant to the virtual sensor. The decision engine selects the set of mobile devices based on value of information of receiving additional sensor data (based for example on estimated reduction in uncertainty and/or demand for the information), and based on constraints for the upload of sensor data from the mobile devices. The constraints include constraints on time intervals (temporal frequencies) to receive sensor data from a mobile device, constraints on network usage, and constraints on mobile device battery/power usage. As noted elsewhere within this Detailed Description, matrix splitting may be utilized to reduce the computational complexity of selecting devices in consideration of multiple dimensions. Furthermore, system objectives—such as reduction of network overhead or reduction in battery usage may be used to choose between combinations of mobile devices and upload time intervals that yield the same or similar estimated inference accuracies.

At 806, an upper sensor abstraction layer (SAL) requests sensor data from the set of mobile devices. The upper SAL acts as an interface to instances of lower SALs executable on the plurality of mobile devices.

At 808, the upper SAL receives the physical sensor data from the mobile devices from the lower SAL instances. The set of mobile devices that are queried for the physical sensor data may, but may not, include a mobile device executing or otherwise benefiting from the application that requested the virtual sensor inference output in the first place. The lower SAL provides the mechanism by which the mobile devices share their sensor data with the architecture. Thus, mobile devices can share their sensor data for use by a virtual sensor and an application without a need to have an instance of the application installed on the mobile device.

At 810, the upper SAL provides the virtual sensor with the physical sensor data. As noted elsewhere within this Detailed Description, the physical sensor data may include GPS data, accelerometer data, light sensor data, audio data, network connectivity data, compass data, video data, or others.

At 812, the virtual sensor outputs inferences to the application based on the physical sensor data received from the upper SAL. In this way, the virtual sensors allow the application to leverage sensors on large numbers of mobile devices to provide functionality. Leveraging large numbers of mobile devices without the virtual sensor architecture of the present disclosure—which is shared amongst many application developers—would be difficult for any one application developer to achieve on its own. The mobile device users control their sensor data usage, and benefit from access to application functionalities that depend on physical and virtual sensor outputs from a large number of mobile devices.

FIGS. 6-8 depict flow graphs that show example processes in accordance with various embodiments. The operations of these processes are illustrated in individual blocks and summarized with reference to those blocks. The processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graphs.

Computer-Readable Media

Depending on the configuration and type of computing device used, memory 204 of the computing system 200 in FIG. 2 and/or memory 304 of FIG. 3 may include volatile memory (such as random access memory (RAM)) and/or non-volatile memory (such as read-only memory (ROM), flash memory, etc.). Memories 204 and 304 may also include additional removable storage and/or non-removable storage including, but not limited to, flash memory, magnetic storage, optical storage, and/or tape storage that may provide non-volatile storage of computer-readable instructions, data structures, program modules, and other data for computing systems 200 and 300.

Memories 204 and 304 are examples of computer-readable media. Computer-readable media includes at least two types of computer-readable media, namely computer storage media and communications media.

Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

Conclusion

Although the disclosure uses language that is specific to structural features and/or methodological acts, the invention is not limited to the specific features or acts described. Rather, the specific features and acts are disclosed as illustrative forms of implementing the invention.

What is claimed is:

1. A method of developing a virtual sensor, the method comprising:
   receiving an inference model configured to accept sensor data from a mobile device and to output inferences based on the sensor data;

inputting training data from another mobile device into the inference model to obtain a set of inferences and associated certainty values based on training data from the other mobile device; and determining, based at least in part on the set of inferences and associated certainty values, another inference model configured to accept other sensor data from the other mobile device and to output other inferences based on the other sensor data.

2. The method of claim 1, wherein the inference model is a substitute inference model based on an initial inference model, the initial inference model configured to accept a first type of sensor data of the mobile device and to output the inferences based on the first type of sensor data, and the substitute inference model configured to accept a second type of sensor data of the mobile device and to output the inferences based on the second type of sensor data.

3. The method of claim 2, further comprising utilizing machine learning to develop the substitute inference model based on the initial inference model and based on a relationship between the first type of sensor data and the second type of sensor data.

4. The method of claim 3, further comprising utilizing machine learning to develop a set of substitute inference models based on the initial inference model, the substitute inference model included in the set of substitute inference models.

5. The method of claim 2, wherein the initial inference model is developed based on test sensor data from the mobile device and an associated set of training labels that correspond to the inferences, the method further comprising selecting the substitute inference model from a set of substitute inference models based on relative accuracies of the substitute inference model, the initial inference model, and others of the set of substitute inference models in matching the training labels to the second type of sensor data.

6. The method of claim 4, wherein the initial inference model is developed based on test sensor data for the first mobile device and an associated set of training labels that correspond to the inferences, the method further comprising selecting the substitute inference model from the set of substitute inference models based on relative energy usages of the substitute inference model, the initial inference model, and others of the set of substitute inference models.

7. The method of claim 1, wherein the inference model is a substitute inference model based on an initial inference model, the method further comprising:

receiving test sensor data and associated training labels, the test sensor data associated with a set of mobile devices including the mobile device; and utilizing machine learning to determine the initial inference model based on the test sensor data and the associated training labels.

8. The method of claim 7, wherein the inferences are based on the associated training labels.

9. The method of claim 1, wherein the utilizing the set of inferences and associated certainty values to determine the other inference model includes utilizing semi-supervised machine learning to adapt the other inference model from the inference model.

10. The method of claim 1, wherein the inference model is a substitute inference model in a plurality of substitute inference models, individual ones of the plurality of substitute inference models based on an initial inference model, individual ones of the substitute inference models configured to accept corresponding types of sensor data of the mobile device and to output the inferences based on the corresponding types of sensor data, the method further comprising:

receiving one or more of the initial inference model and other ones of the plurality of substitute inference models;

utilizing the one or more of the initial inference model and the other ones of the plurality of substitute inference models to output corresponding sets of inferences and associated certainty values, the corresponding sets of inferences and associated certainty values based on corresponding training data from the other mobile device; and utilizing the corresponding sets of inferences and associated certainty values to determine corresponding other inference models configured to accept corresponding other sensor data from the other mobile device and to output the inferences based on the corresponding other sensor data.

11. A method comprising:

receiving, by one or more processors of a computing system, a plurality of values of information, with respect to an inference model, associated with additional sensor data corresponding to a plurality of mobile devices;

determining, by the one or more processors, based on relationship patterns between the plurality of mobile devices and based on the plurality of values of information, one or more combinations of mobile devices and sensing temporal frequencies that meet a plurality of constraints associated with receiving sensor data from the plurality of mobile devices; and requesting, by the one or more processors, sensor data from individual ones of the plurality of mobile devices at time intervals according to a selected one of the one or more combinations.

12. The method of claim 11, wherein the plurality of constraints include constraints on time intervals that the plurality of mobile devices can be sensed from, and constraints on the spatial locations at which the plurality of mobile devices can be sensed from.

13. The method of claim 11, wherein the plurality of values of information include a demand-weighted value of information indicating a decrease of uncertainty if a specific mobile device is sensed from, the demand-weighted value of information also indicating a demand for sensing from the specific mobile device.

14. The method of claim 11, further comprising utilizing diagonalization and pruning to reduce a computational complexity of the determining.

15. The method of claim 11, wherein the relationship patterns between the various mobile devices include one or more of shared working hour patterns, shared living location patterns, familial or business relationship patterns, and time zone patterns of users associated with the various mobile devices.

16. The method of claim 11, further comprising selecting the selected one of the one or more combinations based on an objective to reduce network usage or to reduce mobile device battery usage.

17. A system, comprising:

memory;

one or more processors;

a virtual sensor stored on the memory and executable by the one or more processors to implement inference models that accept physical sensor data from a plurality of mobile devices and to output inferences regarding phenomena to an application, the inferences based on the physical sensor data; and a decision engine configured to select a subset of the plurality of mobile devices and to upload time intervals to provide the physical sensor data based on a value of information of obtaining additional physical sensor data and temporal and location-based constraints placed on the upload of physical sensor data.

18. The system of claim 17, further comprising an upper virtual sensor abstraction layer that is configured to interface between the virtual sensor and an instance of a lower sensor abstraction layer that is executed by one of the plurality of mobile devices, the upper virtual sensor abstraction layer further configured to upload instances of the physical sensor data from the one of the plurality of mobile devices based on the upload time intervals.

19. The system of claim 17, wherein the decision engine is further configured to accept a first inference model of the virtual sensor developed based at least on test physical sensor data from a first mobile device, and to bootstrap the first inference model to a second mobile device to create a second inference model configured to accept physical sensor data from the other mobile device and to output the inferences regarding aspects of the phenomena associated with the second device.

20. The system of claim 17, wherein an instance of the application is executable by a one of the plurality of mobile devices that is not part of the subset of the plurality of mobile devices.

* * * * *